United States Patent
Ryu et al.

(10) Patent No.: US 9,567,235 B2
(45) Date of Patent: Feb. 14, 2017

(54) SOLUTION REACTION APPARATUS AND SOLUTION REACTION METHOD USING THE SAME

(71) Applicant: Inje University Industry-Academic Cooperation Foundation, Gimhae-si, Gyeongsangnam-do (KR)

(72) Inventors: Hyuk Hyun Ryu, Busan (KR); Jin Tak Jang, Gumi-si (KR); Tae Hyun Lee, Changwon-si (KR); Hee Bong Oh, Pohang-si (KR)

(73) Assignee: INJE UNIVERSITY INDUSTRY-ACADEMIC COOPERATION FOUNDATION, Gimhae-si (KR)

( * ) Notice: Subject to any disclaimer, the term of this patent is extended or adjusted under 35 U.S.C. 154(b) by 173 days.

(21) Appl. No.: 14/380,575

(22) PCT Filed: Feb. 25, 2013

(86) PCT No.: PCT/KR2013/001501
§ 371 (c)(1),
(2) Date: Aug. 22, 2014

(87) PCT Pub. No.: WO2013/125929
PCT Pub. Date: Aug. 29, 2013

(65) Prior Publication Data
US 2015/0037244 A1    Feb. 5, 2015

(30) Foreign Application Priority Data

Feb. 24, 2012   (KR) .................. 10-2012-0019313
Feb. 25, 2012   (KR) .................. 10-2013-0019923

(51) Int. Cl.
*B01J 4/00*       (2006.01)
*B01J 19/00*      (2006.01)
(Continued)

(52) U.S. Cl.
CPC .................. *C01G 9/02* (2013.01); *B01J 4/001* (2013.01); *B01J 19/0073* (2013.01); *B01J 19/02* (2013.01);
(Continued)

(58) Field of Classification Search
CPC ............... B01J 4/00; B01J 4/001; B01J 19/00; B01J 19/0053; B01J 19/0073; B01J 19/02; B01J 19/24; B01J 2219/00761; B01J 2219/02; B01J 2219/0254; B01J 2219/0263; B01J 2219/0277; B01J 2219/0281; B01J 2219/0295; B01J 2219/18; B01J 2219/182; B01J 2219/192; B01J 2219/1923; B01J 2219/194; B01J 2219/1943; C01G 3/00; C01G 3/02; C01B 9/00; C01B 9/02; C01P 2004/00; C01P 2001/01; C01P 2004/03; C01P 2004/10; C01P 2004/16; C01P 2004/54; C01P 2004/60; C01P 2004/62; Y02P 20/00; Y02P 20/10; Y02P 20/14; Y02P 20/147; Y02P 20/149
See application file for complete search history.

(56) References Cited

U.S. PATENT DOCUMENTS 4,668,083 A  *  5/1987   Akkapeddi   ............. G03F 7/001
                                                    355/100
6,984,584 B2 *  1/2006   Blackburn   ........ H01L 21/28556
                                                    438/681
2010/0263586 A1  10/2010  Richardson et al.

FOREIGN PATENT DOCUMENTS

JP         10310893 A   *  11/1998
KR     1020050094719 A      9/2005

OTHER PUBLICATIONS

Machine trnaslation of JP 10-310893 A, published on Nov. 24, 1998.*

(Continued)

*Primary Examiner* — Natasha Young
(74) *Attorney, Agent, or Firm* — Lucas & Mercanti, LLP

(57) ABSTRACT

The present invention relates to a solution reaction apparatus and solution reaction method using the same, and more particularly a solution reaction apparatus and a solution reaction method using the same, wherein a reaction vessel is made by using a sealing member, a reaction vessel forming member, and a substrate serving as the bottom part of the reaction vessel so as to cause one side of a reaction solution only to contact the solution, thereby adjusting the temperature of the substrate differently from the temperature of the solution. The solution reaction apparatus of the present invention can control temperature of the substrate and (Continued)

temperature of the reaction solution separately, thereby it can control the temperature of the solution above the boiling point of the solution, and can react the solution while constantly maintaining the concentration of the solution by the solution circulatory device. Accordingly, it has an effect of freely forming various nanostructures on the substrate.

12 Claims, 21 Drawing Sheets

(51) Int. Cl.

| | |
|---|---|
| *B01J 19/02* | (2006.01) |
| *B01J 19/24* | (2006.01) |
| *C01G 3/00* | (2006.01) |
| *C01G 3/02* | (2006.01) |
| *C01G 9/00* | (2006.01) |
| *C01G 9/02* | (2006.01) |

(52) U.S. Cl.
CPC .................. *B01J 19/24* (2013.01); *C01G 3/02* (2013.01); *B01J 2219/00761* (2013.01); *B01J 2219/025* (2013.01); *B01J 2219/0254* (2013.01); *B01J 2219/0263* (2013.01); *B01J 2219/0277* (2013.01); *B01J 2219/0281* (2013.01); *B01J 2219/0295* (2013.01); *B01J 2219/182* (2013.01); *B01J 2219/1923* (2013.01); *B01J 2219/1943* (2013.01); *C01P 2004/03* (2013.01); *C01P 2004/16* (2013.01); *C01P 2004/54* (2013.01); *C01P 2004/62* (2013.01); *Y02P 20/149* (2015.11)

(56) References Cited

OTHER PUBLICATIONS

Machine translation of KR 1020050094719 A, provided in IDS filed on Dec. 22, 2014 and published Sep. 28, 2005.*

S. Deki, et al., "Fabrication of nano-structured . . . liquid phase deposition", Journal of Electroanalytical Chemistry, 2005, pp. 38-43, vol. 584.

K. Pocedikova, et al., "Preparation of galacto-oligosaccharides using membrane reactor", Journal of Food Engineering, 2010, pp. 479-484, vol. 99.

S. M. Abdel Basir, "Recovery of cupric chloride from spent copper etchant solutions: a mechanistic study", Hydrometallurgy, 2003, pp. 135-143, vol. 69.

* cited by examiner

SOLUTION REACTION APPARATUS AND SOLUTION REACTION METHOD USING THE SAME

This application is a 371 of PCT/KR2013/001501, now WO 2013/125929, filed Feb. 25, 2013, which claims the benefit of Korean Patent Application Nos. 10-2012-0019313, filed Feb. 24, 2012 and 10-2013-0019923, filed Feb. 25, 2013, the contents of each of which are incorporated herein by reference.

FIELD OF THE INVENTION

The present invention relates to a solution reaction apparatus and a solution reaction method using the same, and more particularly to a solution reaction apparatus and a solution reaction method using the same, wherein a reaction vessel is made by using a sealing member, a reaction vessel forming member and a substrate serving as the bottom part of the reaction vessel so as to cause one side of a reaction solution only to contact the solution, thereby adjusting the temperature of the substrate differently from the temperature of the solution.

BACKGROUND OF THE INVENTION

Studies for manufacturing semiconductor devices, optical devices and memory devices using unique electrical, optical and magnetic properties of nanomaterials are proceeding, and in order to make the devices using the nanomaterials, a technique, which can grow the nanomaterials at a desired position, is essential. For this, previously, these device structures were embodied by Top-down method by which a semiconductor thin film is grown first, and then structure is remained by etching at the desired position. However, if etching is conducted by this method, physical and chemical damages of the material deposited by the method are inevitable, and this fatal problem of this previous method serves as a barrier to embody active optical devices such as laser.

Due to the problems of the Top-down method, Bottom-up method, which selectively grows nanomaterials, is being studied and developed, and it has an advantage, which can grow a desired material at a desired position to a desired shape, not to introduce the etching process because its basic concept is different from the previous Top-down method. As this Bottom-up method, a method for forming microstructure through chemical reaction occurred in a solution is being actively studied because it is easy to low temperature and mass production. Among solution reactions, i.e., methods for growing crystals using chemical reaction occurred in a solution, a general method of hydrothermal synthesis is a method, wherein metals, inorganic oxides and inorganic hydroxides are mixed with a reaction solution and additives needed for crystal growth, the mixed suspension is put into a high pressure reactor, and then crystals are synthesized or grown at a temperature of about 300° C. or less and a self-pressure of about 100 Mpa. In the case of zinc oxide, it is known that crystals can be grown vertically after pretreating a substrate on a two-dimensional flat substrate or forming seeds of the crystal on the surface thereof.

This previous hydrothermal synthesis method has advantages that crystals can be grown at relatively lower temperature than a catalyst and vapor deposition method, and can be produced in bulk. However, because it soaks the substrate itself in the reaction solution of the high pressure reactor and reacts thereof, there is a limit that the temperature of the substrate and the solution should be same, and it is impossible to change the kind and the concentration of the solution as the reaction progresses. Further, there was a problem that it is impossible to inpour the reaction solution as the reaction progresses in order because all reactants should be mixed at the same time.

SUMMARY OF THE INVENTION

In order to solve the above-mentioned problems, the present invention is objected to provide a novel solution reaction apparatus, which can control the temperature of a substrate and a reaction solution separately and circulate the reaction solution during the reaction by not immersing a substrate in a solution and forming a reaction vessel using the substrate as a bottom part by improving the conventional method using hydrothermal synthesis, thereby it can freely control the temperature and the concentration of the reaction solution.

Further, the present invention is objected to provide a solution reaction method using the solution reaction apparatus according to the present invention.

In order to accomplish one object of the present invention, the present invention provides a solution reaction apparatus, which comprises:
  a substrate;
  a sealing member laminated on one side of the substrate;
  a reaction vessel forming member being laminated on the sealing member and forming a reaction vessel, which can contain reaction solution for solution reaction, using the substrate as a bottom part; and
  a reaction solution circulatory part circulating the reaction solution into the reaction vessel, which is formed from the substrate, the sealing member and the reaction vessel forming member.

In the solution reaction apparatus of the present invention, the substrate may be selected from the group consisting of Si, $Al_2O_3$, GaN, GaAs, ZnO, InP, SiC, glass and plastic substrates.

In the solution reaction apparatus of the present invention, the plastic substrate may be selected from the group consisting of polyethylene naphthalate (PEN), polyethylene terephthalate (PET), polyether sulfone (PES), polyimide, polycarbonate, cyclic olefin copolymer and a mixture thereof.

In the solution reaction apparatus of the present invention, the sealing member may be O-ring or silicon rubber.

In the solution reaction apparatus of the present invention, the reaction vessel forming member may be made of teflon, epoxy or urethane.

In the solution reaction apparatus of the present invention, the substrate may further comprise a buffer layer.

In the solution reaction apparatus of the present invention, the substrate may further comprise a nanostructure layer.

In the solution reaction apparatus of the present invention, the reaction solution circulatory part may comprise:
  an inlet, which inpours the reaction solution for solution reaction treatment of the substrate into the reaction vessel formed from the substrate and the reaction vessel forming member;
  an outlet, which outpours the reaction solution from the reaction vessel; and
  a circulation pump, which is connected to the inlet and the outlet, respectively, and circulates the reaction solution.

The solution reaction apparatus of the present invention may comprise a plurality of the inlets.

The solution reaction apparatus of the present invention may comprise a plurality of the outlets.

The solution reaction apparatus of the present invention may further comprise a control part.

The solution reaction apparatus of the present invention may further comprise a temperature sensor.

The solution reaction apparatus of the present invention may further comprise a heating part for heating the substrate at the bottom of the substrate.

Further, the present invention provides a solution reaction method, which comprises the steps of:
- preparing a substrate for solution reaction treatment;
- installing a sealing member on top of one side of the substrate;
- installing a reaction vessel forming member on top of the sealing member;
- inpouring a reaction solution into a reaction vessel, which is formed from the substrate, the sealing member and the reaction vessel forming member; and
- outpouring the reaction solution from the reaction vessel.

Hereinafter, the present invention will be described in detail with reference to the accompanying drawings.

FIG. 1 and FIG. 3 are perspective views of the solution reaction apparatus according to the present invention, and FIG. 2 and FIG. 4 are exploded perspective views thereof.

As shown in FIG. 1 or FIG. 2, the solution reaction apparatus according to the present invention comprises: a substrate 10, 100 for solution reaction treatment; a sealing member 20, 200 being laminated on one side of the substrate, and forming circular closed space along the edge of the substrate; a reaction vessel forming member 30, 300 being laminated on the sealing member, and forming a reaction vessel, which can contain reaction solution for solution reaction, using the substrate as a bottom part; and a reaction solution circulatory part 50, 51, 60, 61; 500, 510, 600, 610 circulating the reaction solution into the reaction vessel, which is formed from the substrate, the sealing member and the reaction vessel forming member.

In the solution reaction apparatus according to the present invention, the sealing member 20, 200 and the reaction vessel forming member 30, 300 are laminated on the substrate in order, and forms the reaction vessel, which can contain solution reaction solution, using the substrate as a bottom part.

The sealing member 20, 200 may be made of an elastic material to play a role in sealing between the reaction vessel forming member and the substrate by being installed between the substrate and the reaction vessel forming member, preferably. Its entire shape is not limited if is in the form of a closed curve, which can encircle the edge of the substrate, and for example, it may be a circle 20 as shown in FIG. 1 and FIG. 2 or a square 200 as shown in FIG. 3 and FIG. 4.

Specifically, in the present invention, the sealing member 20, 200 may be O-ring or silicon, preferably.

The forming member 30, 300 may be formed with the same shape with the sealing member and a certain height to form the reaction vessel while compressing the sealing member 20, 200, and it may be made of Teflon, epoxy or urethane, preferably.

In the solution reaction apparatus of the present invention, the substrate 10 is a substrate for solution reaction treatment, and its material is not particularly limited, and for example, it may be made of any material selected from the group consisting of Si, $Al_2O_3$, GaN, GaAs, ZnO, InP, SiC, glass and plastic substrates.

In the solution reaction apparatus of the present invention, the plastic substrate may be selected from the group consisting of polyethylene naphthalate (PEN), polyethylene terephthalate (PET), polyether sulfone (PES), polyimide, polycarbonate, cyclic olefin copolymer or a mixture thereof.

Further, in the present invention, the substrate also may be a substrate on which a buffer layer was already deposited, or a substrate on which a nanostructure was already formed. Namely, it may be a substrate, wherein ITO is deposited on a glass substrate or a substrate wherein FTO is deposited on a glass substrate.

In the solution reaction apparatus of the present invention, a nanostructure can be additionally formed on top of the substrate where a nanostructure was already formed by controlling temperature, concentration, inpour rate and inpour time of the inpoured reaction solution.

As shown in FIG. 5, in the solution reaction apparatus according to the present invention, the reaction solution circulatory part may comprise: an inlet 50, which inpours the reaction solution for solution reaction treatment of the substrate into the reaction vessel formed from the substrate and the reaction vessel forming member; an outlet 60, which outpours the reaction solution from the reaction vessel; and a circulation pump 51, 61, which is connected to the inlet and the outlet, respectively, and circulates the reaction solution.

As shown in FIG. 6, in the solution reaction apparatus according to the present invention, the inlet 50 inpours the reaction solution from the reaction solution storing part 52 outside into the reaction vessel, and the outlet 60 circulates the reaction solution in the reaction vessel while outpouring the reaction solution from the reaction vessel to the reaction solution storing part 62 outside.

As shown in FIG. 5 and FIG. 6, the inlet 50 and the outlet 60 may be formed separately from the reaction vessel forming member, or as shown in FIG. 5, they can be formed as directly connected to the side of the reaction vessel forming member 30.

As shown in FIG. 8, the solution reaction apparatus according to the present invention may further comprise a control part 70.

As shown in FIG. 8, the control part 70 may be connected to an inlet circulation pump or outlet circulation pump 51, 61 thereby changing the rate of the reaction solution inpoured into the reaction vessel, or changing the rate of the reaction solution outpoured from the reaction vessel. Further, as shown in FIG. 8, it may be separately connected to each circulation pump, or like the control part 70' shown in FIG. 9, it may be simultaneously connected to the inlet circulation pump and the outlet circulation pump thereby controlling syntagmatically.

Further, though not illustrated separately, in the solution reaction apparatus according to the present invention, the control part may be connected to a heating device 40 of the substrate thereby controlling the temperature of the substrate.

As shown in FIG. 10, in the solution reaction apparatus according to the present invention, a plurality of the inlets or outlets may be installed as needed. Namely, in this case, each circulation pumps are connected via the control part 70", thereby it may be possible to inpour a plurality of the reaction solutions at different temperature, respectively, or to react with time difference.

As shown in FIG. 1 to FIG. 11, the solution reaction apparatus according to the present invention may further comprise a heating device 40, 400 for heating the substrate at the bottom of the substrate. The heating device 40, 400 for heating the substrate may be a heating plate, but not particularly limited, and it may be a device used for heating the substrate in general chemical vapor deposition, for example.

The substrate heating device 40 may allow controlling the temperature of the substrate, apart from the temperature of the solution supplied into the reaction vessel on top of the substrate.

As shown in FIG. 11, in the solution reaction apparatus according to the present invention, it is possible to additionally comprise a temperature sensor 80 in the reaction vessel. As shown in FIG. 11, the temperature sensor 80 is connected to the control part 70, thereby operating the heater depending on the temperature of the reaction vessel, or changing the inpouring rate of the reaction solution into the solution reaction vessel.

A solution reaction method using the solution reaction apparatus as described above comprises the steps of: preparing a substrate for solution reaction treatment; installing a sealing member on top of one side of the substrate; installing a reaction vessel forming member on top of the sealing member; inpouring a reaction solution into a reaction vessel, which is formed from the substrate, the sealing member and the reaction vessel forming member; and outpouring the reaction solution from the reaction vessel.

Advantageous Effects of the Invention

The solution reaction apparatus of the present invention can control temperature of the substrate and temperature of the reaction solution separately, thereby it can control the temperature of the solution above the boiling point of the solution, and can react the solution while constantly maintaining the concentration of the solution by the solution circulatory device. Accordingly, it has an effect of freely forming various nanostructures on the substrate.

BRIEF DESCRIPTION OF DRAWINGS

The above and other objects and features of the present invention will become apparent from the following description of the invention taken in conjunction with the following accompanying drawings, which respectively show.

DETAILED DESCRIPTION OF THE INVENTION

Hereinafter, the present invention will be described in further detail with reference to examples, and the scope of the present invention cannot be limited thereby in any way.

Example 1

Manufacturing of Zinc Oxide Nanostructure Using Glass Substrate

Zinc oxide nanostructures were manufactured on a glass substrate by the solution reaction method as follows.

Figure 1:
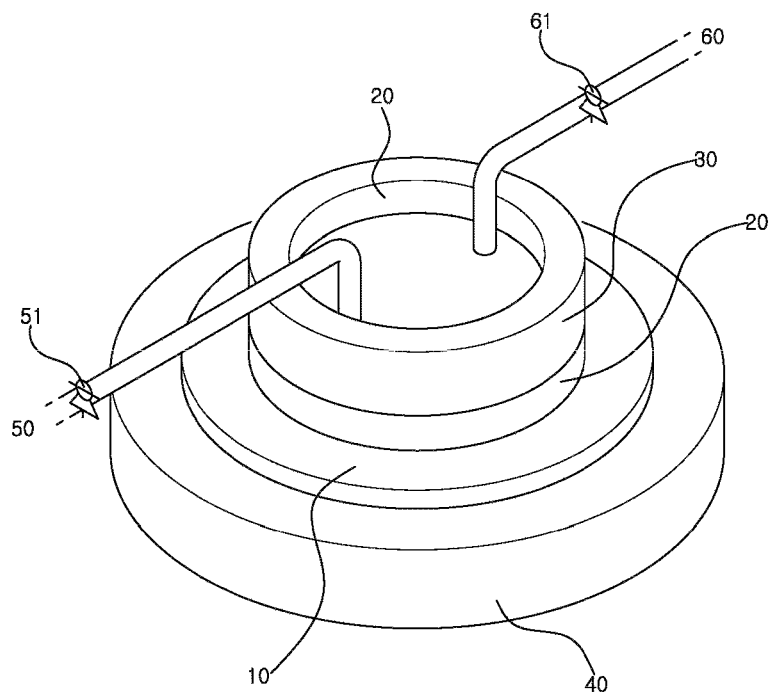
FIG. 1 to FIG. 4: perspective views and exploded perspective views of the solution reaction apparatus according to the present invention.
Figure 2:
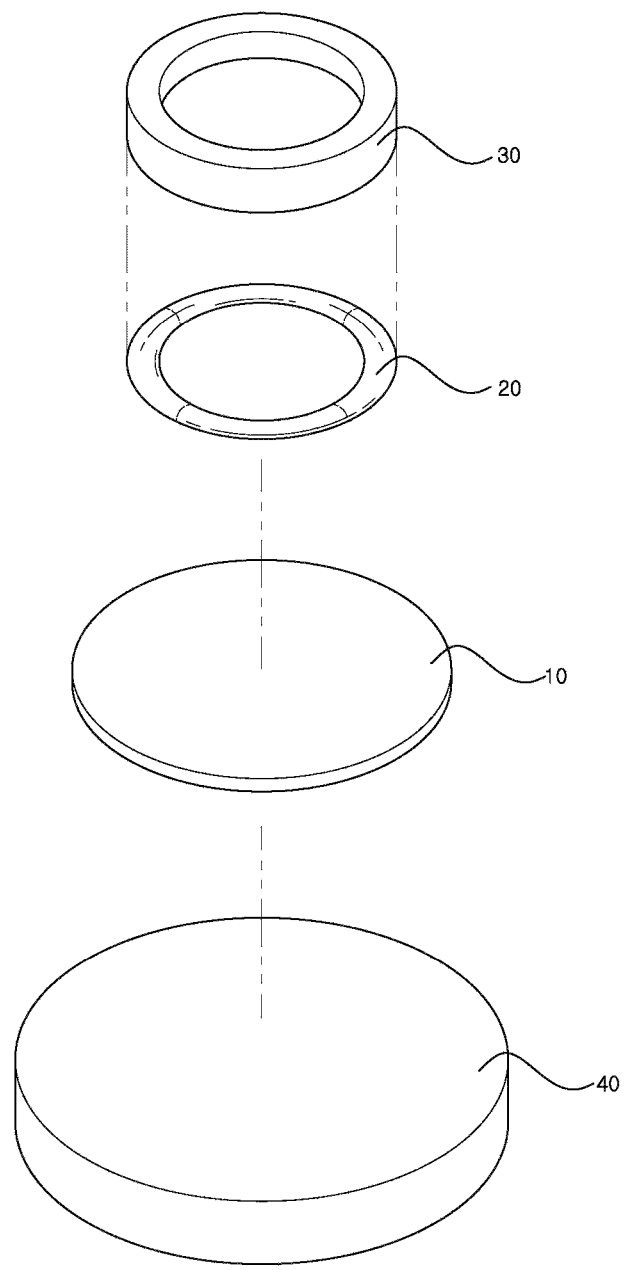
Figure 3:
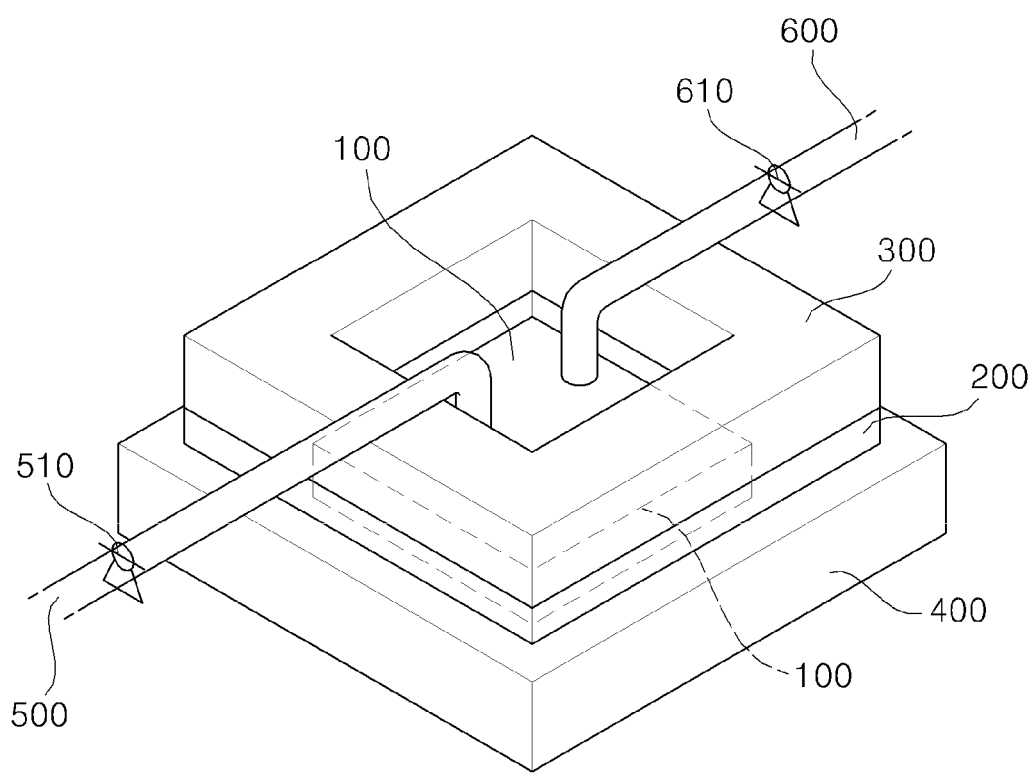
Figure 4:
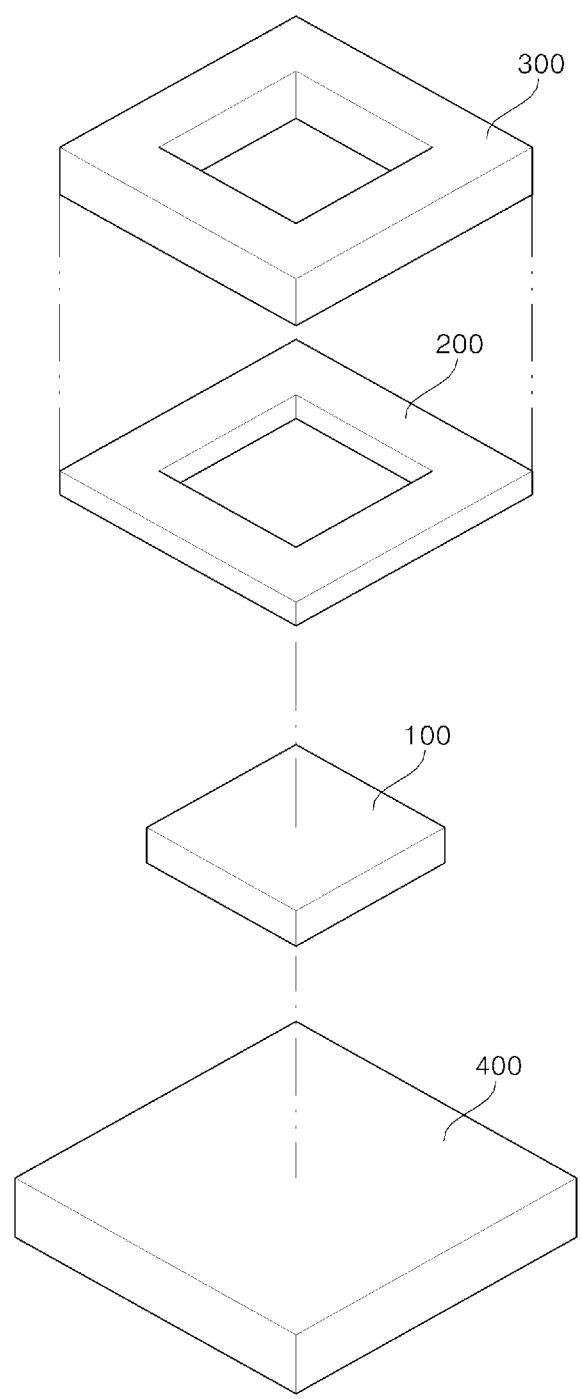
Figure 5:
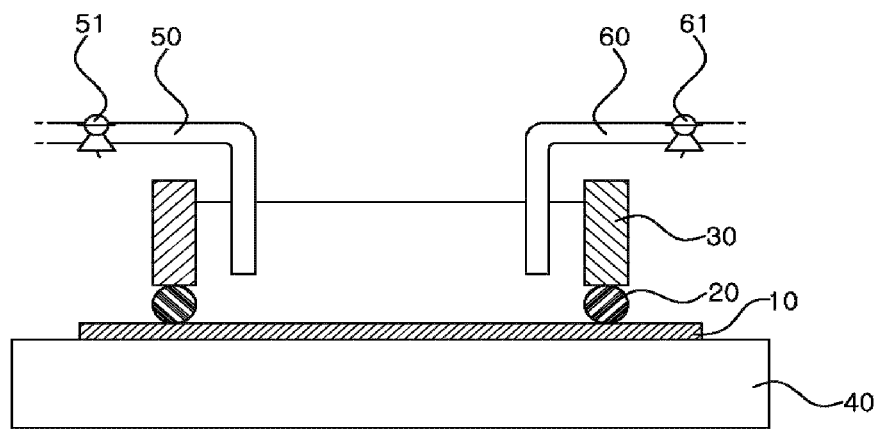
FIG. 5 to FIG. 11: schematic diagrams of the solution reaction apparatus according to the present invention.
Figure 6:
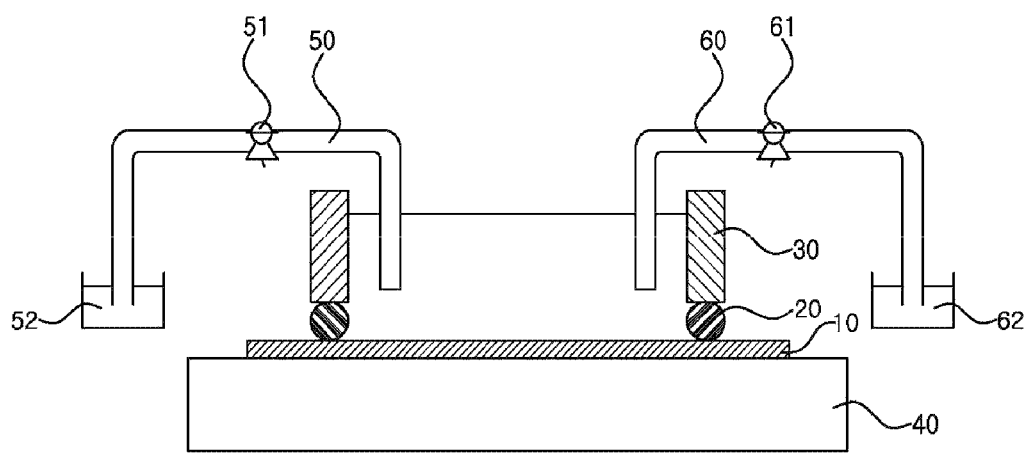
Figure 7:
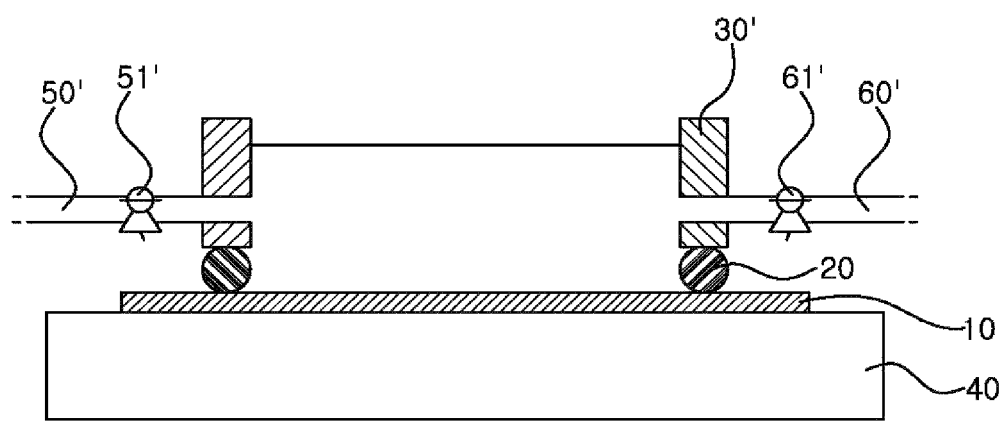
Figure 8:
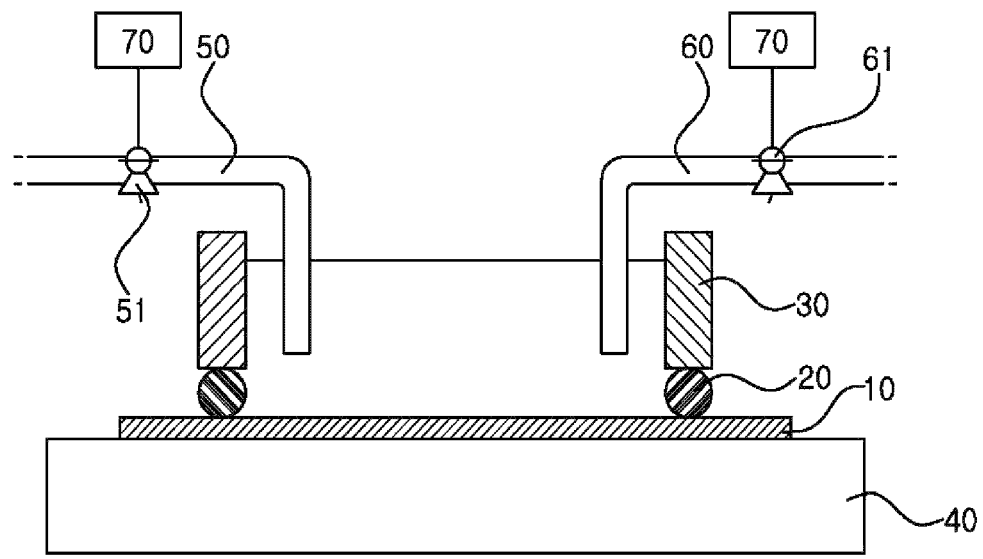
Figure 9:
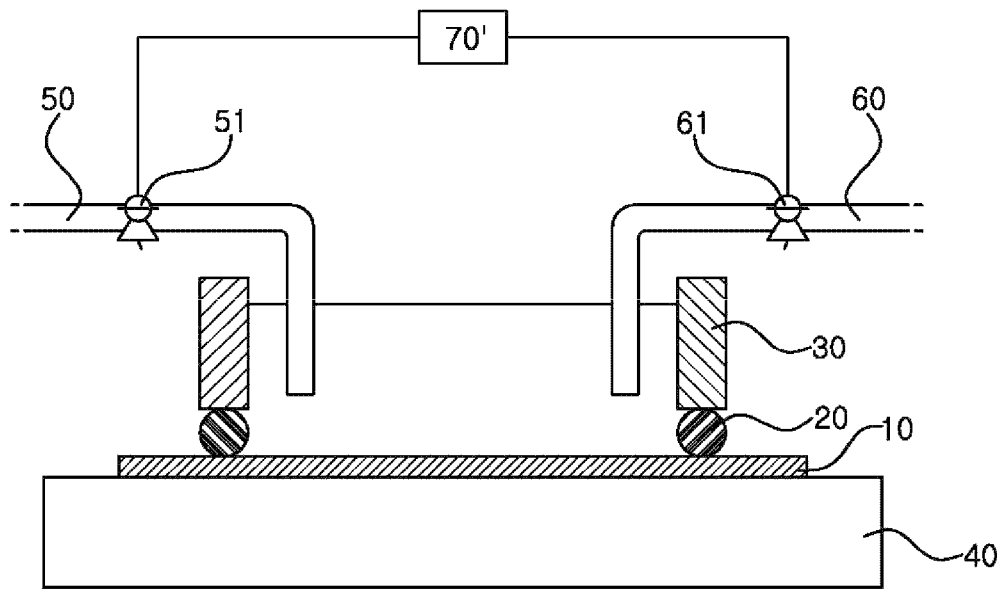
Figure 10:
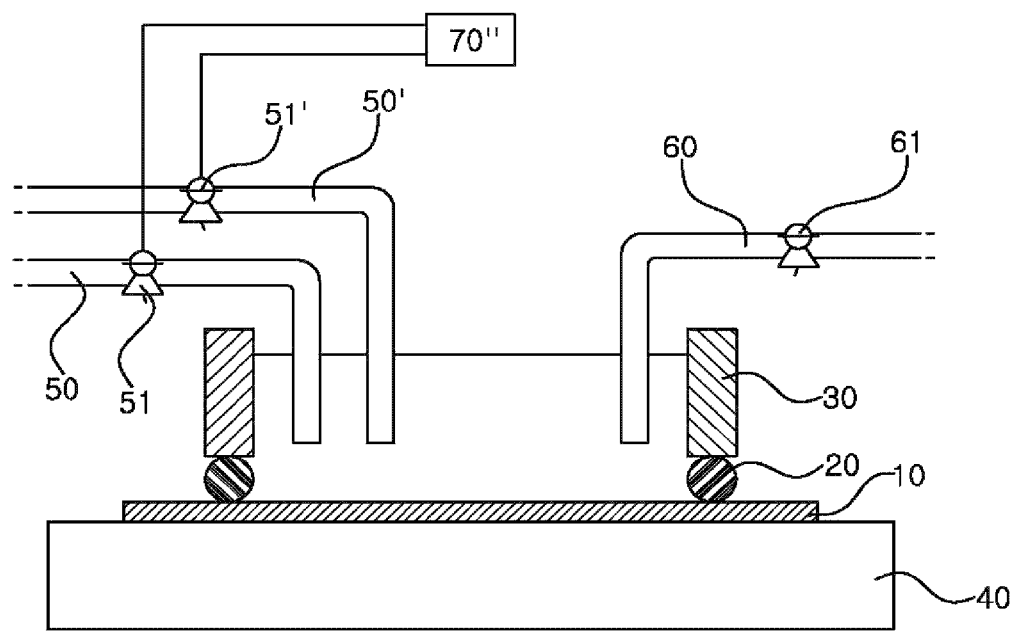
Figure 11:
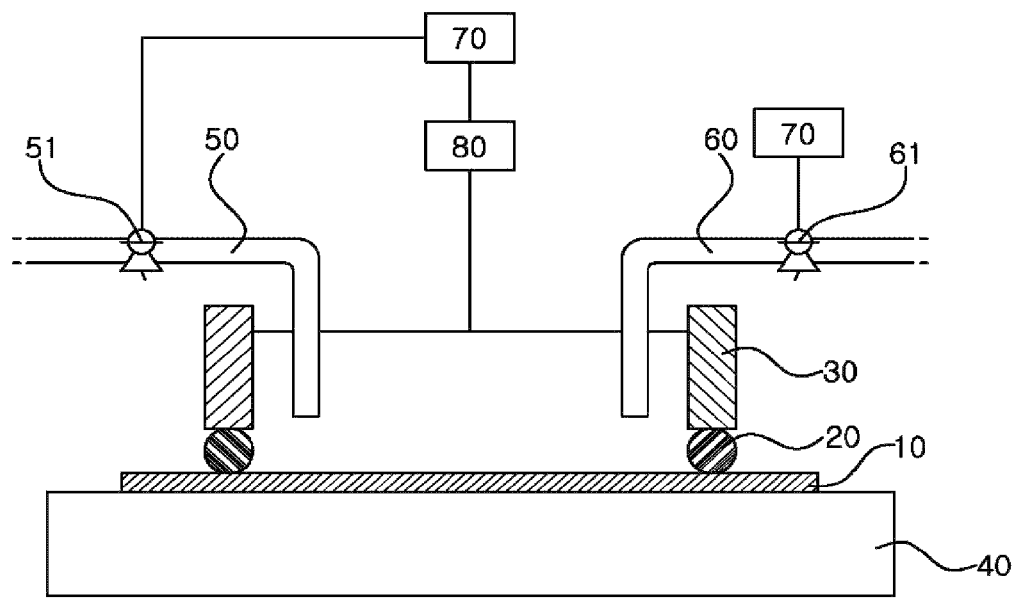

First of all, a solution reaction apparatus was manufactured as illustrated in FIG. 1. As a substrate, a glass substrate on which ITO was deposited to a thickness of 50 nm, as a sealing member on the substrate, an O-ring was used, and as a reaction vessel forming member, Teflon was used.

Figure 12:
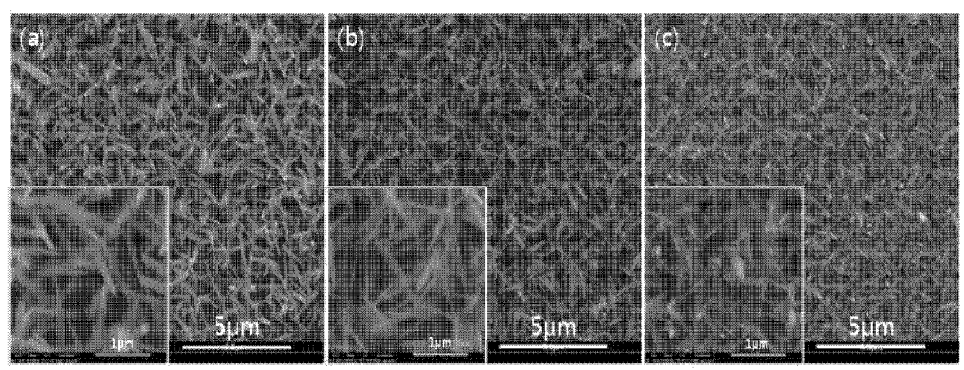
FIG. 12: results of manufacturing zinc oxide nanostructures by the solution reaction apparatus and the solution reaction method according to one Example of the present invention.

Zinc acetate and ammonia aqueous solution were used as a reaction solution for growing zinc oxide. The substrate was installed on a heating plate, and zinc oxide nanoparticles were formed by controlling the temperature of the substrate to (a) 150° C., (b) 160° C. and (c) 180° C., respectively. SEM images are shown in FIG. 12.

Example 2

Manufacturing of Zinc Oxide Nanostructure Using Silicon Substrate

The procedure of Example 1 was repeated except for using a silicon substrate on which a 50 nm zinc oxide buffer layer was already formed as a substrate to manufacture zinc oxide nanostructures.

Figure 13:
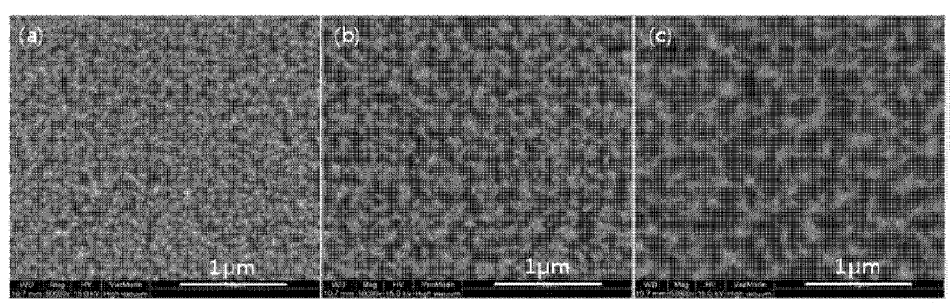
FIG. 13: results of manufacturing zinc oxide nanostructures by the solution reaction apparatus and the solution reaction method according to one Example of the present invention.

Zinc acetate and ammonia aqueous solution were used as a reaction solution for growing zinc oxide. The substrate was installed on a heating plate, and zinc oxide nanoparticles were formed by controlling the temperature of the substrate to 150° C. and the reaction time to (a) 10 min, (b) 30 min and (c) 60 min, respectively. SEM images are shown in FIG. 13.

Example 3

Manufacturing Zinc Oxide Nanostructure

Figure 14:
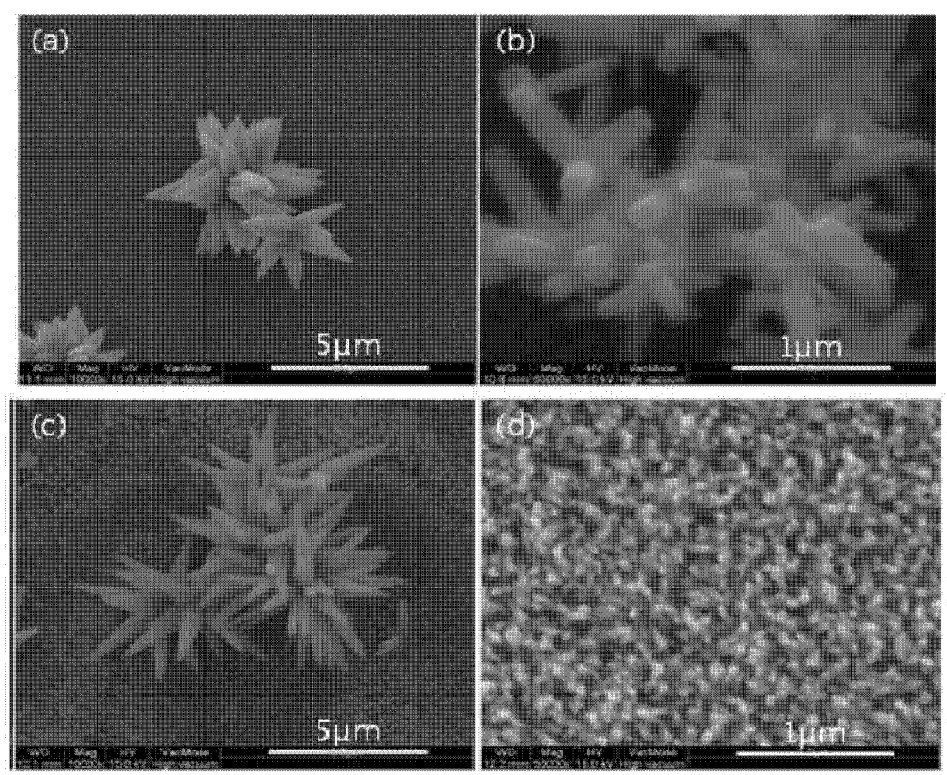
FIG. 14: results of manufacturing zinc oxide nanostructures by the solution reaction apparatus and the solution reaction method according to one Example of the present invention.

A silicon substrate on which a 50 nm zinc oxide buffer layer was already formed was used as a substrate, and zinc oxide nanostructures were manufactured by using two kinds of reaction solution but changing the type, concentration, inpouring rate, substrate temperature and growth time of each kind of reaction solution as shown in the following Table 1. SEM images of the manufactured zinc oxide nanostructures are shown in FIG. 14.

TABLE 1

| | Reaction Solution 1 | Reaction Solution 2 | Reaction Solution Inpouring Rate | Substrate Temperature (° C.) | Reaction Time |
|---|---|---|---|---|---|
| a | Zinc Acetate 0.005M | Ammonia 40:1 | 5 | 95 | 10 min |
| b | Zinc Acetate 0.005M | Ammonia 40:1 | 7 | 160 | 30 min |
| c | Zinc Acetate 0.005M | Ammonia 40:1 | 5 | 95 | 10 min |
| d | Zinc Acetate 0.005M | Hexamethylene Tetramine 0.01M | 5 | 100 | 2 hr |

Example 4

Manufacturing Zinc Oxide Nanostructure

Example 4-1

Manufacturing Zinc Oxide Nanostructure Depending on Growth Time

Figure 15:
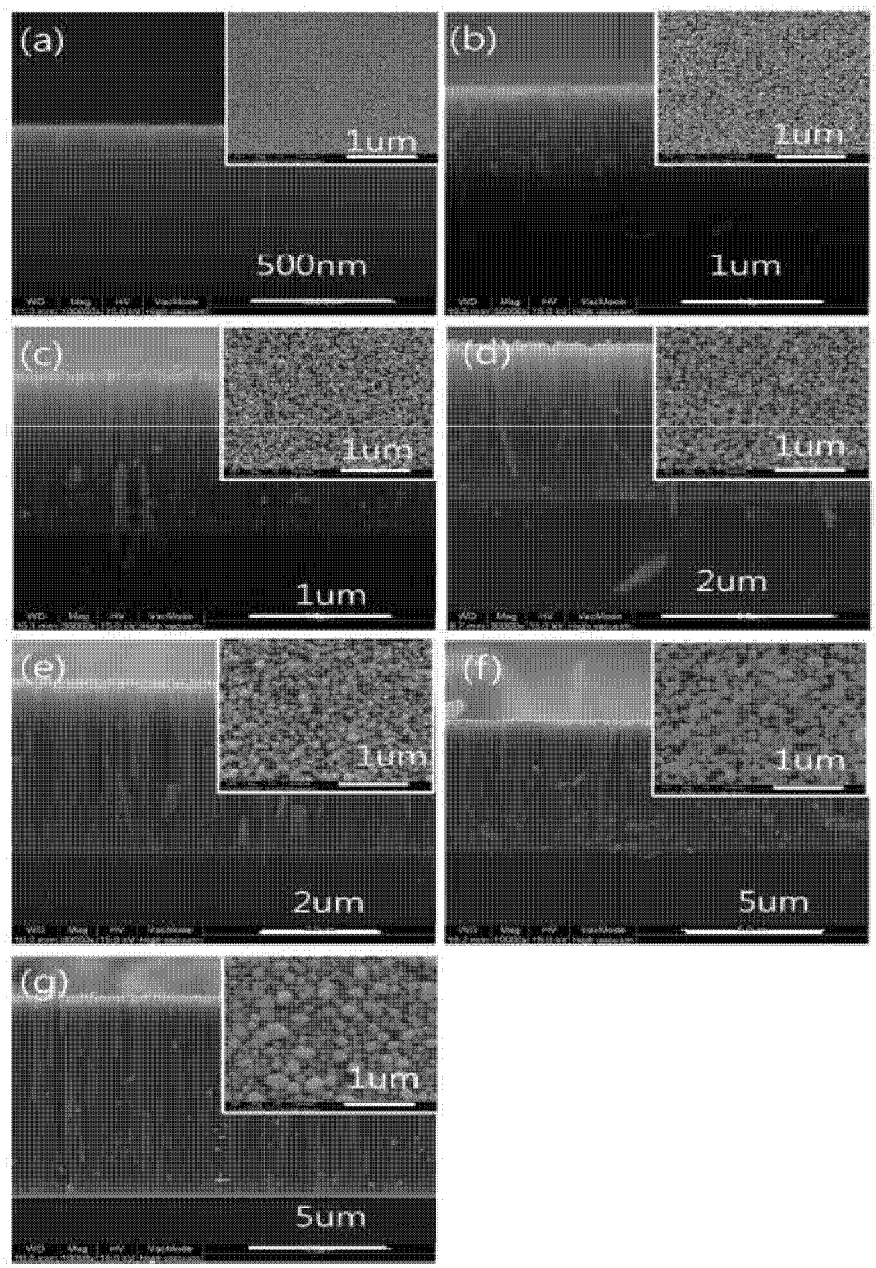
FIG. 15: SEM images of the zinc oxide nanostructures, which are manufactured by changing the growth time to (a) 1 min, (b) 5 min, (c) 10 min, (d) 20 min, (e) 40 min, (f) 60 min and (g) 100 min at the growth temperature of 120° C.

A silicon substrate on which a 50 nm zinc oxide buffer layer was already formed was used as a substrate, a mixture of zinc acetate 0.01 M and ammonia at the ratio of 10:1 was used as a reaction solution, and zinc oxide nanostructures were manufactured by changing the inpouring rate from 2.5 to 5 rpm and the growth time to (a) 1 min, (b) 5 min, (c) 10 min, (d) 20 min, (e) 40 min, (f) 60 min and (g) 100 min at the growth temperature 120° C. SEM images of the manufactured zinc oxide nanostructures are shown in FIG. 15.

Figure 16:
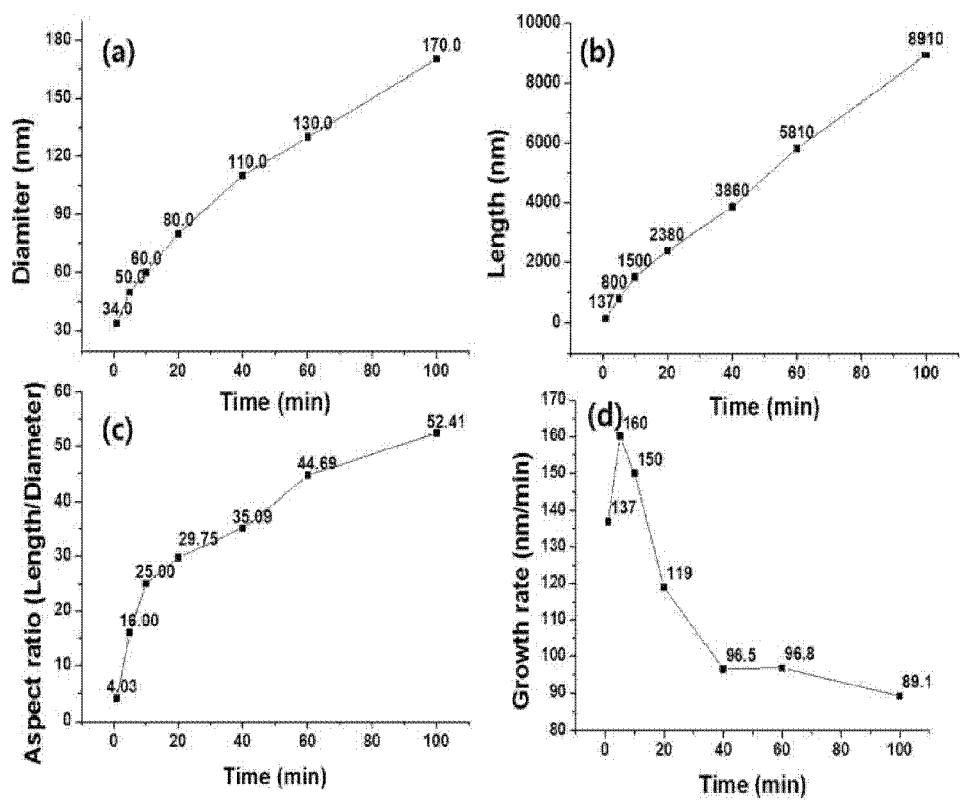
FIG. 16: results of measuring length, diameter, aspect ratio and growth rate of the nanostructure grown at each time.

The length, diameter, aspect ratio and growth rate of the grown nanostructure were measured, and the results were shown in FIG. 16. In FIG. 16, it can be found that the length, diameter, aspect ratio and growth rate are increased as the growth time is increased.

Example 4-2

Manufacturing Zinc Oxide Nanostructure Depending on Growth Temperature

Figure 17:
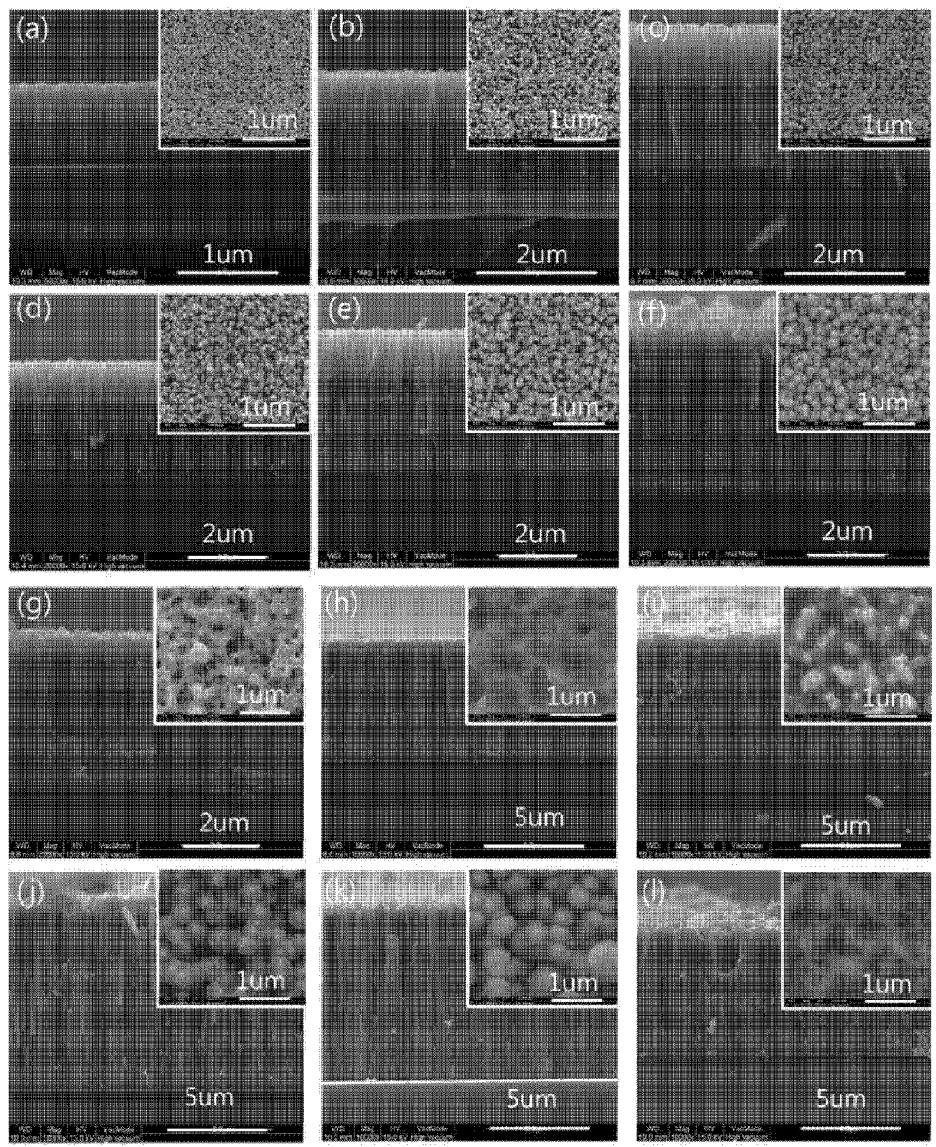
FIG. 17: SEM images of the zinc oxide nanostructures, which are manufactured by changing the growth temperature to (a) 100° C., (b) 110° C., (c) 120° C., (d) 130° C., (e) 140° C., (f) 150° C., (g) 160° C., (h) 170° C., (i) 180° C., (j) 190° C., (k) 200° C. and (l) 210° C. for the growth time of 20 min.
Figure 18:
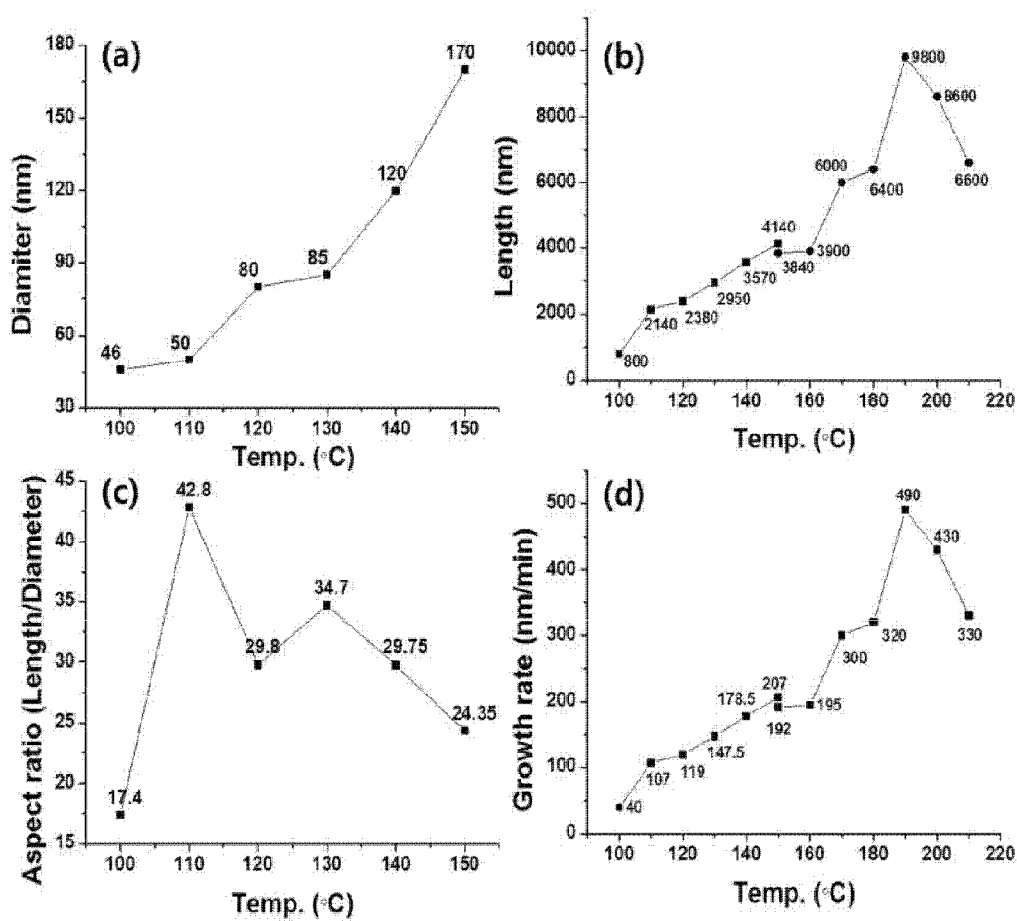
FIG. 18: results of measuring length, diameter, aspect ratio and growth rate of the nanostructure grown at each temperature.

A silicon substrate on which a 50 nm zinc oxide buffer layer was already formed was used as a substrate, a mixture of zinc acetate 0.01 M and ammonia at the ratio of 10:1 was used as a reaction solution, and zinc oxide nanostructures were manufactured by changing the inpouring rate from 2.5 to 5 rpm and the growth temperature to (a) 100° C., (b) 110° C., (c) 120° C., (d) 130° C., (e) 140° C., (f) 150° C., (g) 160° C., (h) 170° C., (i) 180° C., (j) 190° C., (k) 200° C. and (l) 210° C. for the growth time of 20 min. SEM images of the manufactured zinc oxide nanostructures are shown in FIG. 17. The length, diameter, aspect ratio and growth rate of the grown nanostructure were measured, and the results were shown in FIG. 18.

Figure 19:
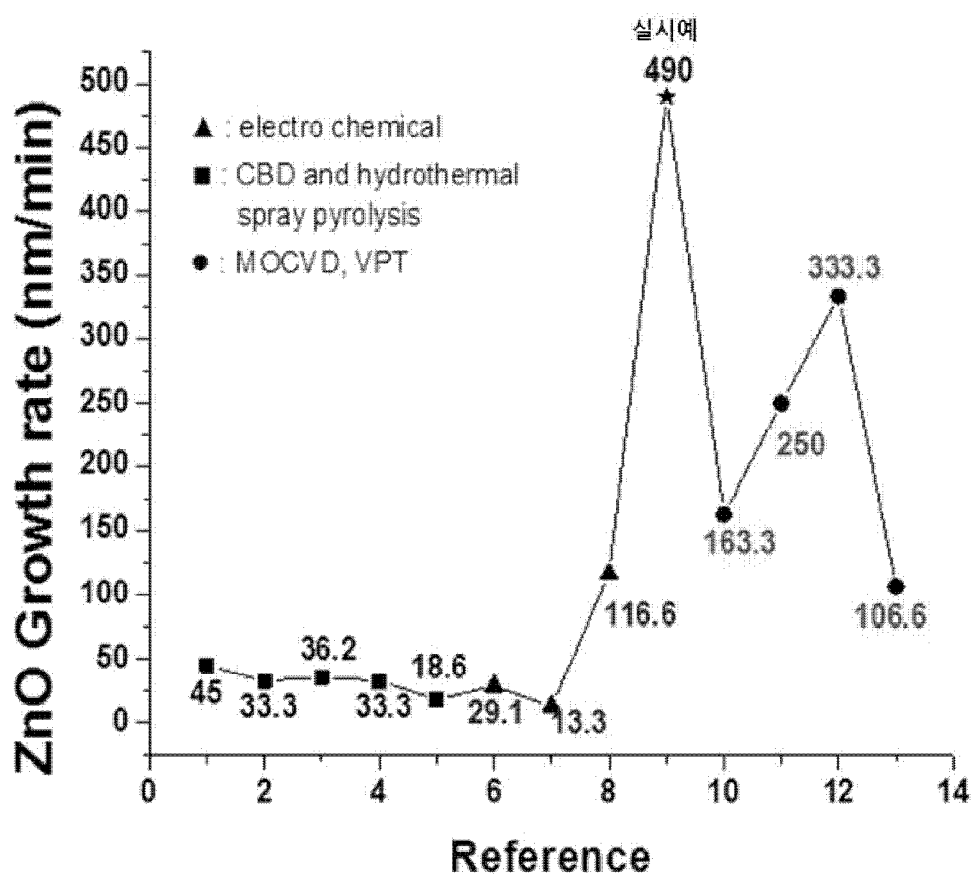
FIG. 19: results of comparing the growth rate of the zinc oxide in Example of the present invention and Comparative Examples.

As Comparative Examples, using data in literature, the zinc growth rates when manufacturing the zinc oxide by electrochemical method, CBD method and MOCVD method were shown in FIG. 19. In FIG. 19, the manufacturing method of Example according to the present invention shows the fastest growth rate.

Example 5

Manufacturing Copper Oxide Nanostructure

A washed FTO substrate was used as a substrate, and a solution was prepared by using $Cu(OAc)_2 \cdot H_2O$, 2-Methoxy-ethanol (2-ME) and monoethanolamine (MEA). The prepared solution was spin-coated on the substrate at 4000 rpm for 30 sec followed by drying in the air for 10 min. This procedure was repeated three times, and the nanostructure was grown with $Cu(OAc)_2 \cdot H_2O$ solution and ammonia aqueous solution at 175° C. for 20 min by using the solution reaction apparatus manufactured in Example 1, followed by washing with ultra-pure water and dried.

Figure 20:
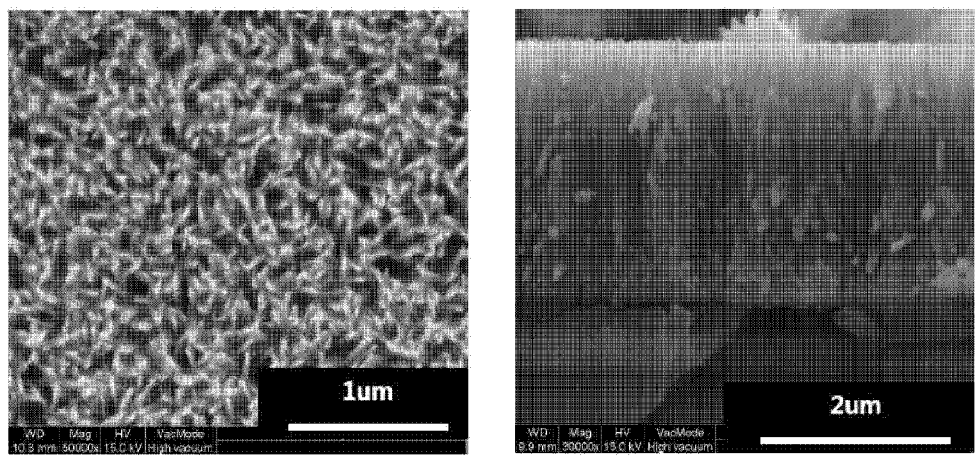
FIG. 20: SEM images of the copper oxide nanostructure of Example 5 of the present invention.
Figure 21:
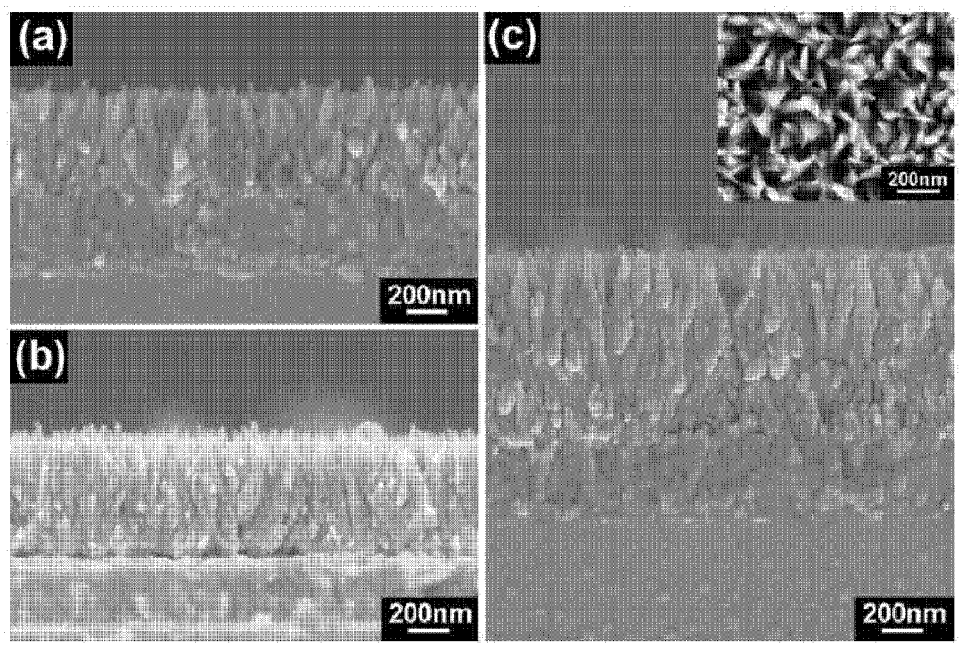
FIG. 21: SEM images of the copper oxide nanostructure disclosed in [Journal of Alloys and Compounds 511 (2012) 195. 197] as Comparative Example.

As Comparative Example, copper oxide nanostructures were manufactured by the method of L. Liu disclosed in Journal of Alloys and Compounds 511 (2012) 195. 197. Specifically, a FTO substrate was used, and it was soaked in $Cu(OAc)_2 \cdot H_2O$ ethanol solution as a reaction solution for 10 sec, dried in the air, heated at 100° C. for 1 min, and then, further heated at 250° C. for 150 min. Nanostructures were grown with $Cu(OAc)_2 \cdot H_2O$ solution and HMTA aqueous solution at 75° C. for 240 min, washed with ultra-pure water and then dried. SEM images of the copper oxide nanostructures of Example 5 were shown in FIG. 20, and SEM images of the cooper oxide nanostructures disclosed in Journal of Alloys and Compounds 511 (2012) 195. 197 as Comparative Example were shown in FIG. 21. In FIG. 21, (a), (b) and (c) are the SEM images of the nanostructures grown at 85° C., 80° C. and 75° C., respectively.

Characteristics of the nanostructure manufactured in Example 5 and the nanostructure manufactured at 75° C. as Comparative Example were measured, and the results were shown in the following Table 2.

TABLE 2

| | Example 4 | Comparative Example |
|---|---|---|
| Processing Time | 240 min | 20 min |
| Nanorod Length | About 900 nm | About 1600 nm |
| Nanorod Diameter | About 60 nm | About 70 nm |
| Aspect Ratio | About 15 | About 23 |
| Growth Rate | About 3.8 nm/min | About 80 nm/min |

As shown in Table 2, it can be found that the copper oxide manufactured by Example of the present invention shows increased length, diameter and aspect ratio of the nanostructure, and its growth rate is 20 times or more higher than Comparative Example.

While the invention has been described with respect to the above specific embodiments, it should be recognized that various modifications and changes may be made and also fall within the scope of the invention as defined by the claims that follow.

What is claimed is:

1. A solution reaction apparatus, which comprises:
   a substrate;
   a sealing member laminated on one side of the substrate;
   a reaction vessel forming member being laminated on the sealing member and forming a reaction vessel, which can contain reaction solution for solution reaction, using the substrate as a bottom part; and a reaction solution circulatory part circulating the reaction solution into the reaction vessel, which is formed from the substrate, the sealing member and the reaction vessel forming member, wherein the substrate comprises a nanostructure layer.

2. The solution reaction apparatus according to claim 1, wherein the substrate is selected from the group consisting of Si, $Al_2O_3$, GaN, GaAs, ZnO, InP, SiC, glass and plastic substrates.

3. The solution reaction apparatus according to claim 2, wherein the plastic substrate is selected from the group consisting of polyethylene naphthalate (PEN), polyethylene terephthalate (PET), polyether sulfone (PES), polyimide, polycarbonate, cyclic olefin copolymer and a mixture thereof.

4. The solution reaction apparatus according to claim 1, wherein the sealing member is O-ring or silicon rubber.

5. The solution reaction apparatus according to claim 1, wherein the reaction vessel forming member is made of Teflon, epoxy or urethane.

6. The solution reaction apparatus according to claim 1, wherein the substrate further comprises a buffer layer.

7. The solution reaction apparatus according to claim 1, wherein the reaction solution circulatory part comprises:

an inlet, which inpours the reaction solution for solution reaction treatment of the substrate into the reaction vessel formed from the substrate and the reaction vessel forming member;

an outlet, which outpours the reaction solution from the reaction vessel; and a circulation pump, which is connected to the inlet and the outlet, respectively, and circulates the reaction solution.

8. The solution reaction apparatus according to claim 7, which comprises a plurality of the inlets.

9. The solution reaction apparatus according to claim 7, which comprises a plurality of the outlets.

10. The solution reaction apparatus according to claim 1, wherein the solution reaction apparatus further comprises a control part.

11. The solution reaction apparatus according to claim 1, wherein the solution reaction apparatus further comprises a temperature sensor.

12. The solution reaction apparatus according to claim 1, which further comprises a heating part for heating the substrate at the bottom of the substrate.

* * * * *